(12) United States Patent
Amir et al.

(10) Patent No.: US 8,267,468 B2
(45) Date of Patent: Sep. 18, 2012

(54) BRACKET STRUCTURE IN VEHICLE BODY REAR PORTION

(75) Inventors: Hossain Amir, Hamamatsu (JP);
Takayuki Souma, Hamamatsu (JP);
Kazuaki Ikejima, Hamamatsu (JP);
Teruhisa Mita, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/085,646

(22) Filed: Apr. 13, 2011

(65) Prior Publication Data

US 2011/0254319 A1    Oct. 20, 2011

(30) Foreign Application Priority Data

Apr. 20, 2010    (JP) ................................ 2010-096875

(51) Int. Cl.
*B62D 25/08*    (2006.01)
(52) U.S. Cl. ................................. 296/193.08
(58) Field of Classification Search ............. 296/193.08, 296/187.11, 203.04, 193.07, 187.08, 204
See application file for complete search history.

(56) References Cited

U.S. PATENT DOCUMENTS

| | | | | |
|---|---|---|---|---|
| 5,364,128 A * | 11/1994 | Ide | ................................ | 296/204 |
| 5,803,533 A * | 9/1998 | Schulz et al. | ................. | 296/204 |
| 7,281,755 B2 * | 10/2007 | Coakley | .................... | 296/187.08 |
| 7,429,076 B2 * | 9/2008 | Asahi et al. | .............. | 296/203.04 |
| 7,469,950 B2 * | 12/2008 | Cox et al. | ........................ | 296/30 |
| 2006/0197300 A1 * | 9/2006 | Nakashima et al. | ... | 280/124.109 |
| 2009/0256390 A1 * | 10/2009 | Kobayakawa | ........... | 296/187.11 |
| 2011/0121613 A1 * | 5/2011 | Souma et al. | ............ | 296/203.04 |

FOREIGN PATENT DOCUMENTS

| | | |
|---|---|---|
| JP | 10-315791 | 12/1998 |
| JP | 2006-088740 | 4/2006 |

* cited by examiner

*Primary Examiner* — H Gutman
(74) *Attorney, Agent, or Firm* — Myers Bigel Sibley & Sajovec, PA (57) ABSTRACT

A bracket structure is in a vehicle body rear portion. In the bracket structure, an upper bracket 19 and first and second lower brackets 18 and 15 are disposed in such a manner as to be shifted to a right side or a left side in the vehicle width direction from an axis passing through a center of a spare tire housing 5, the second lower bracket 15 is formed in a concave shape and a closed section is formed between the first lower bracket 18 and the second lower bracket 15 by superposing the first lower bracket 18 and the second lower bracket 15, and the upper bracket 19 is attached to a top surface of the rear floor panel 4, and the upper bracket 19 and the first lower bracket 18 are disposed so as to correspond to each other in a vertical direction.

5 Claims, 6 Drawing Sheets

BRACKET STRUCTURE IN VEHICLE BODY REAR PORTION

CROSS-RELATED APPLICATIONS

This application claims priority from Japanese Patent Application No. 2010-096875; filed Apr. 20, 2010, the disclosure of which is incorporated herein by reference in its entirety.

BACKGROUND OF THE INVENTION

The present invention relates to a bracket structure in a vehicle body rear portion, and more specifically, relates to a structure of multiple brackets mounted on a rear floor panel forming a rear floor in a vehicle body.

In a structure of a vehicle body rear portion, a bracket for supporting a muffler, a seat belt anchor bracket, and the like are attached to a rear floor panel forming a floor in a vehicle interior. Conventionally, to reduce a load applied to the rear floor panel, various attachment structures for a muffler suspending bracket and a seat belt anchor have been proposed (for example, JP 10-315791 A and JP 2006-88740 A).

JP 10-315791 A discloses a structure in which both end portions of a cross member extending in a vehicle width direction are fastened to right and left side members extending in a vehicle front-rear direction, and a muffler suspending bracket (for example, bracket 30) is attached to the cross member.

JP 2006-88740 A discloses a structure in which a cross member extending in a vehicle width direction is installed at a location in front of a back panel disposed in a vehicle body rear portion, a rear floor panel is provided on the cross member, and a seat belt anchor is attached at a position in which the floor panel and the cross member are superposed.

In general, a spare tire housing for housing a spare tire is provided in a rear floor panel forming a floor in a vehicle body rear portion. In the above-described conventional structures, to reduce the load applied to the rear floor panel, the cross member is disposed on the rear floor panel, and the muffler suspending bracket and the seat belt anchor are attached to the cross member.

In the above-described conventional structures, however, since parts such as the muffler suspending bracket and the seat belt anchor are attached to the cross member at different positions, a sufficient space is not secured between the cross member and the spare tire housing. Accordingly, the above-described conventional structures have a problem associated with the securing of a space between the cross member and the spare tire housing, such as interference occurring between a fuel tank and an exhaust pipe upon reception of a load due to collision.

In addition, in the above-described conventional structures, the parts such as the muffler suspending bracket and the seat belt anchor individually receive and absorb the load. Accordingly, the absorption of the load is not efficient.

SUMMARY OF THE INVENTION

The present invention has been made in view of the above-described circumstances. Accordingly, an object of the present invention is to provide a bracket structure in a vehicle body rear portion, the bracket structure being capable of efficiently absorbing a load applied from a muffler and a seat belt anchor on the rear floor panel, with a space being secured between a cross member and a spare tire housing, which are attached to a rear floor panel.

To solve the problems of the conventional techniques as described above, the bracket structure in a vehicle body rear portion according to the present invention includes a rear floor panel forming a floor in a rear portion of a vehicle interior; a cross member disposed on the rear floor panel, and extending in a vehicle width direction; and a spare tire housing disposed on the rear floor panel, and configured to house a spare tire on a rear side of the cross member in a vehicle, in which a plurality of brackets are connected to the cross member, the plurality of brackets include an upper bracket disposed above the rear floor panel, a first lower bracket disposed under the rear floor panel and a second lower bracket disposed under the first lower bracket, the first lower bracket and the second lower bracket extend toward the rear of the vehicle from the cross member along the rear floor panel, the upper bracket, the first lower bracket, and the second lower bracket are disposed in such a manner as to be shifted to a right side or a left side in the vehicle width direction with respect to an axis passing through a center of the spare tire housing, the second lower bracket is formed in a concave shape, and a closed section is formed between the first lower bracket and the second lower bracket by superposing the first lower bracket and the second lower bracket, and the upper bracket is attached to a top surface of the rear floor panel, and the upper bracket and the first lower bracket are disposed so as to correspond to each other in a vertical direction.

In addition, according to another embodiment of the present invention, the first lower bracket and the second lower bracket are disposed between the cross member and the spare tire housing, and rear end portions of the first lower bracket and the second lower bracket are disposed adjacent to a bent portion around the spare tire housing.

In addition, according to another embodiment of the present invention, the second lower bracket is a muffler suspending bracket for supporting a muffler, and the upper bracket and the first and second lower brackets are disposed in such a manner as to be shifted to a side on which the muffler is disposed, with respect to the axis passing through the center of the spare tire housing.

In addition, according to another embodiment of the present invention, the upper bracket is a seat belt anchor bracket, and the first lower bracket is a seat belt anchor reinforce.

In addition, according to another embodiment of the present invention, the cross member includes a main body portion disposed at a center position in the vehicle width direction and two brace portions connected to side members and disposed with the main body portion interposed therebetween, the upper bracket, the first lower bracket, and the second lower bracket are disposed on the main body portion of the cross member, and a rigidity of the main body portion of the cross member is set lower than rigidities of the two brace portions.

The bracket structure in a vehicle body rear portion according to the present invention includes a rear floor panel forming a floor in a rear portion of a vehicle interior; a cross member disposed on the rear floor panel, and extending in a vehicle width direction; and a spare tire housing disposed on the rear floor panel, and configured to house a spare tire on a rear side of the cross member in a vehicle, in which a plurality of brackets are connected to the cross member, the plurality of brackets include an upper bracket disposed above the rear floor panel, a first lower bracket disposed under the rear floor panel and a second lower bracket disposed under the first lower bracket, the first lower bracket and the second lower bracket extend toward the rear of the vehicle from the cross member along the rear floor panel, the upper bracket, the first lower bracket, and the second lower bracket are disposed in such a manner as to be shifted to a right side or a left side in the vehicle width direction with respect to an axis passing through a center of the spare tire housing, the second lower bracket is formed in a concave shape, and a closed section is formed between the first lower bracket and the second lower bracket by superposing the first lower bracket and the second lower bracket, and the upper bracket is attached to a top surface of the rear floor panel, and the upper bracket and the first lower bracket are disposed so as to correspond to each other in a vertical direction. Accordingly, the three brackets, which are conventionally attached to the cross member at different positions, are superposed and disposed at a single position on the cross member. Hence, the load is absorbed at the single position by the three brackets in cooperation. This not only improves the rigidity against the load, but also makes it possible to efficiently absorb the load. Moreover, since the first lower bracket and the second lower bracket form a closed section, the rigidity upon reception of the load can be further increased.

In addition, since the three brackets, which are conventionally attached to the cross member at different positions, are attached at the single position on the cross member, a space is secured between the spare tire housing and the cross member. Accordingly, even when a load is applied from the vehicle rear side, the interference between the fuel tank and the exhaust pipe can be reduced.

In addition, according to the bracket structure in a vehicle body rear portion according to the present invention, the first lower bracket and the second lower bracket are disposed between the cross member and the spare tire housing, rear end portions of the first lower bracket and the second lower bracket are disposed adjacent to a bent portion around the spare tire housing. The bent portion of the spare tire housing has a higher rigidity than a flat portion thereof because of the bead effect. Hence, when being disposed adjacent to the bent portion, the rear end portions of the first and second lower brackets can increase the rigidity in cooperation with the bent portion of the spare tire housing.

In addition, according to the bracket structure in a vehicle body rear portion according to the present invention, the second lower bracket is a muffler suspending bracket for supporting a muffler, and the upper bracket and the first and second lower brackets are disposed in such a manner as to be shifted to a side on which the muffler is disposed, with respect to the axis passing through the center of the spare tire housing. As a result, the muffler suspending bracket is disposed at a position close to the muffler. The stability of the muffler suspended thereby is improved in comparison with conventional cases. This makes it possible to reduce vibration noise transmitted from the muffler in comparison with conventional cases.

In addition, according to the bracket structure in a vehicle body rear portion according to the present invention, the upper bracket is a seat belt anchor bracket, and the first lower bracket is a seat belt anchor reinforcement. As a result, the seat belt anchor bracket and the seat belt anchor reinforce are supported from below by the second lower bracket (the muffler suspending bracket). Hence, the attachment rigidity of the seat belt anchor bracket can be increased in comparison with conventional cases.

In addition, since the seat belt anchor bracket is disposed at a position rearward of the rear seat in the vehicle body, a load imposed obliquely from an up-front position in the seat belt can be received by the seat belt anchor bracket along the direction of the load. Accordingly, the load of the seat belt can be absorbed more efficiently.

In addition, according to the bracket structure in a vehicle body rear portion according to the present invention, the cross member includes a main body portion disposed at a center position in the vehicle width direction, and two brace portions connected to side members and disposed with the main body portion interposed therebetween, the upper bracket, the first lower bracket, and the second lower bracket are disposed on the main body portion of the cross member, and a rigidity of the main body portion of the cross member is set lower than rigidities of the two brace portions. Accordingly, when subjected to a load from the vehicle rear side due to collision or the like, the main body portion of the cross member can deform to absorb the load. In addition, the load from the seat belt is also absorbed by not only the deformation of the upper bracket and the first and second lower brackets, but also the deformation of the main body portion alone of the cross member. Accordingly, the load imposed on the two brace portions of the cross member is reduced. As a result, the load imposed on the vehicle main body (particularly, side members) can be reduced. Since this suppresses the deformation of the vehicle main body, the number of parts to be replaced during repair can be reduced.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
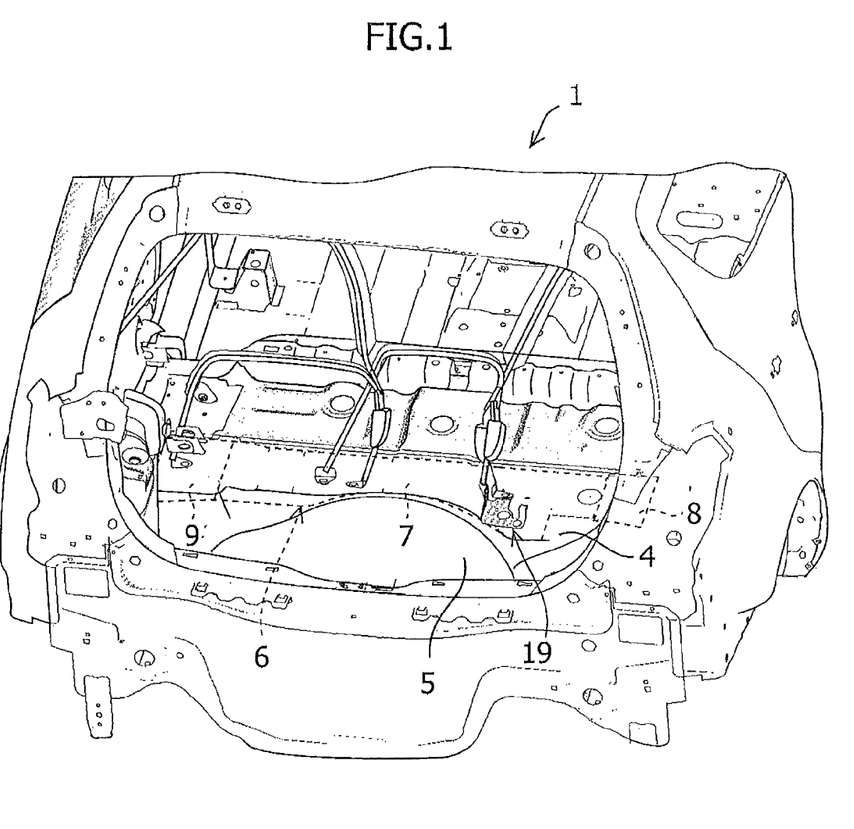
FIG. 1 is a perspective view of a vehicle body rear portion according to an embodiment of the present invention viewed from above.
Figure 2:
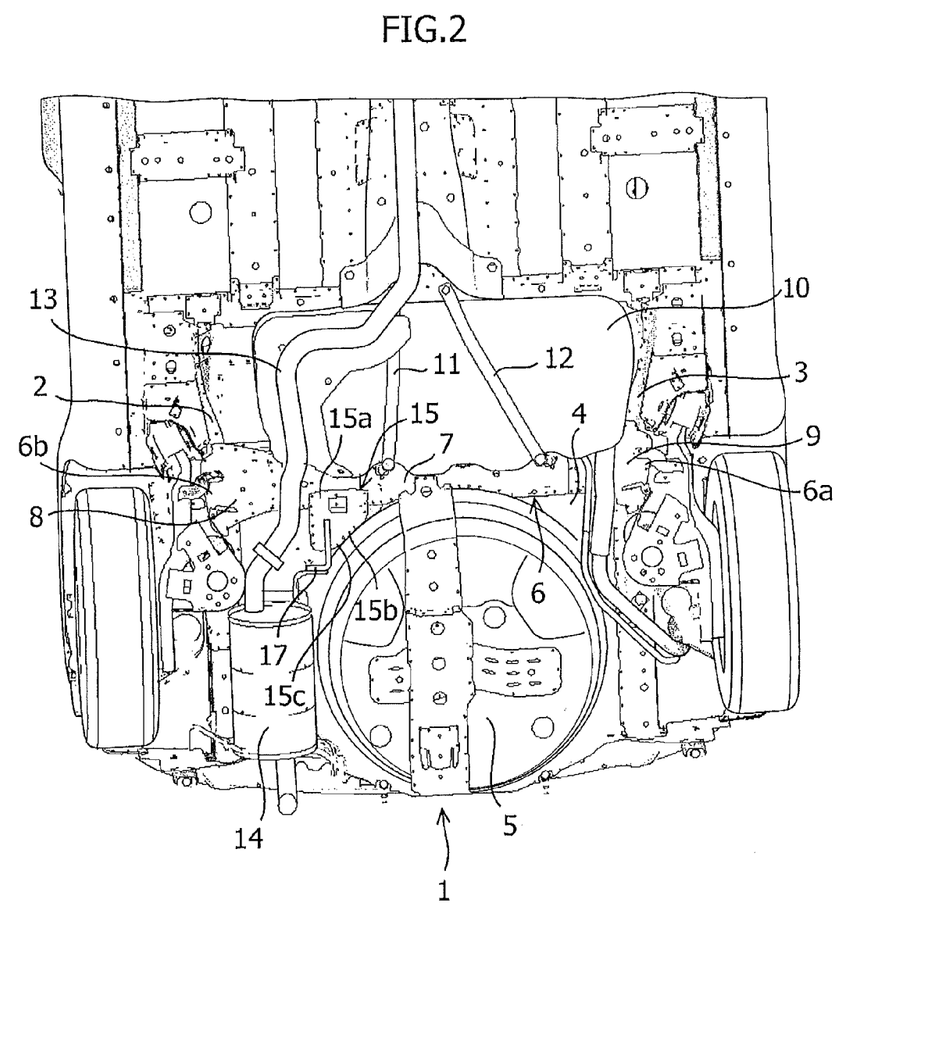
FIG. 2 is a view of the vehicle body rear portion according to the embodiment of the present invention viewed from below.
Figure 3:
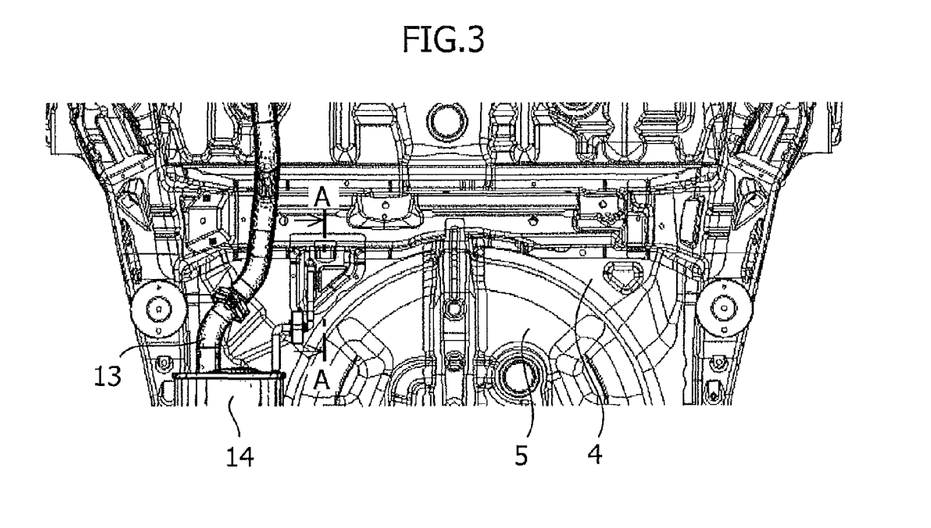
FIG. 3 is a partial cross-sectional view of the vehicle body rear portion according to the embodiment of the present invention viewed from below.
Figure 4:
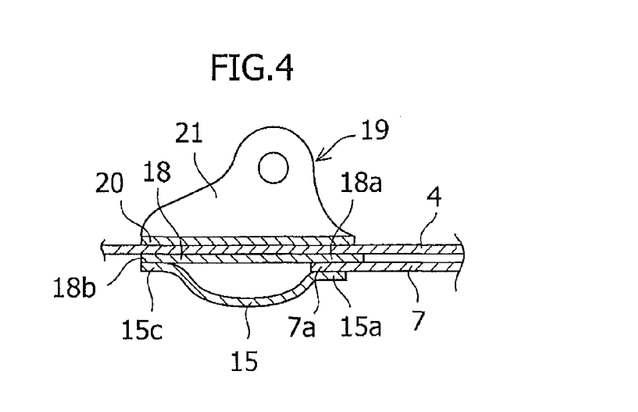
FIG. 4 is a cross-sectional view taken along the line A-A in FIG. 3.
Figure 5:
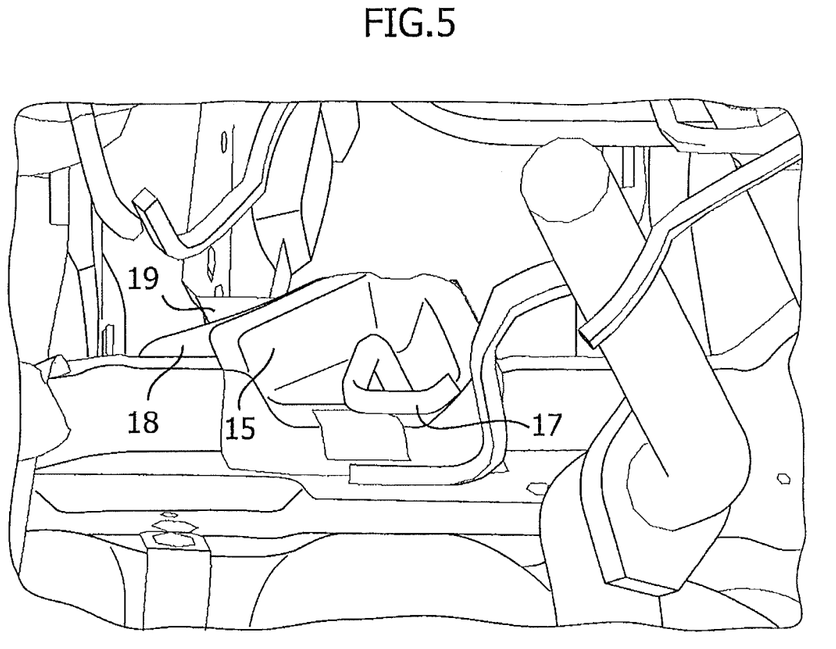
FIG. 5 is an enlarged perspective view of the vehicle body rear portion according to the embodiment of the present invention viewed from below, where a rear floor panel is omitted.
Figure 6:
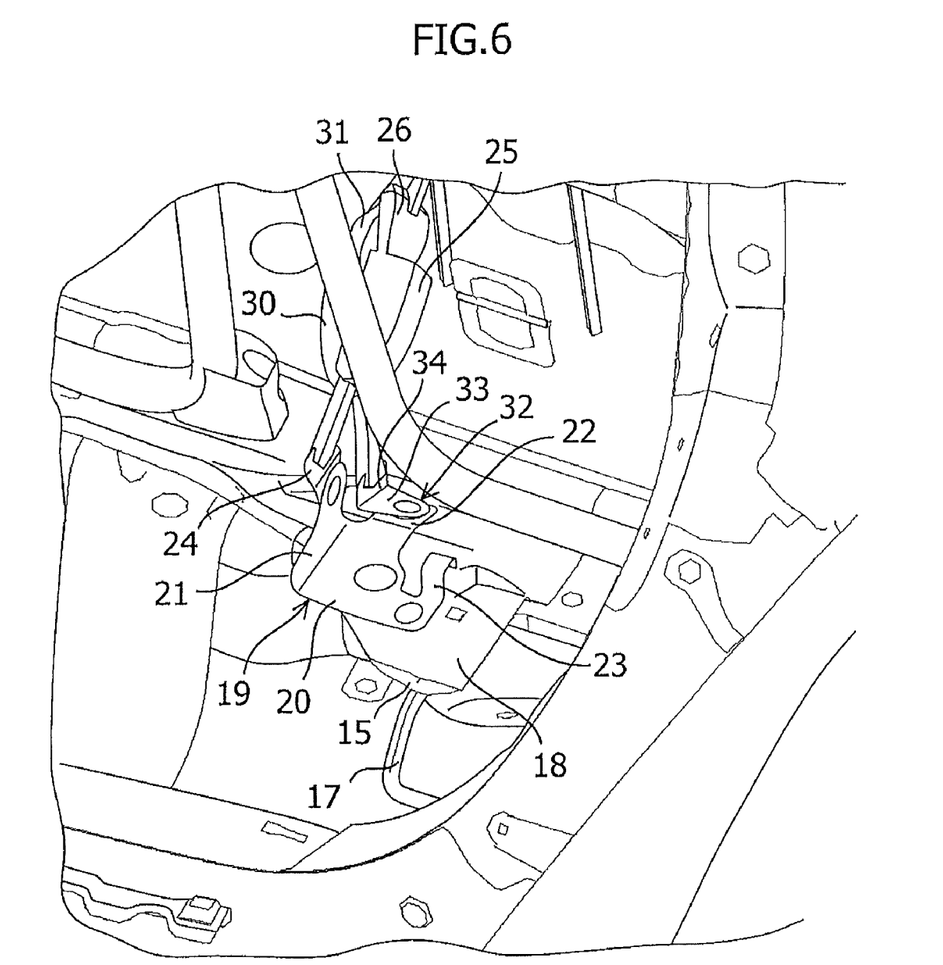
FIG. 6 is an enlarged perspective view of a seat belt anchor bracket according to the embodiment of the present invention, in which the rear floor panel is omitted.
Figure 7:
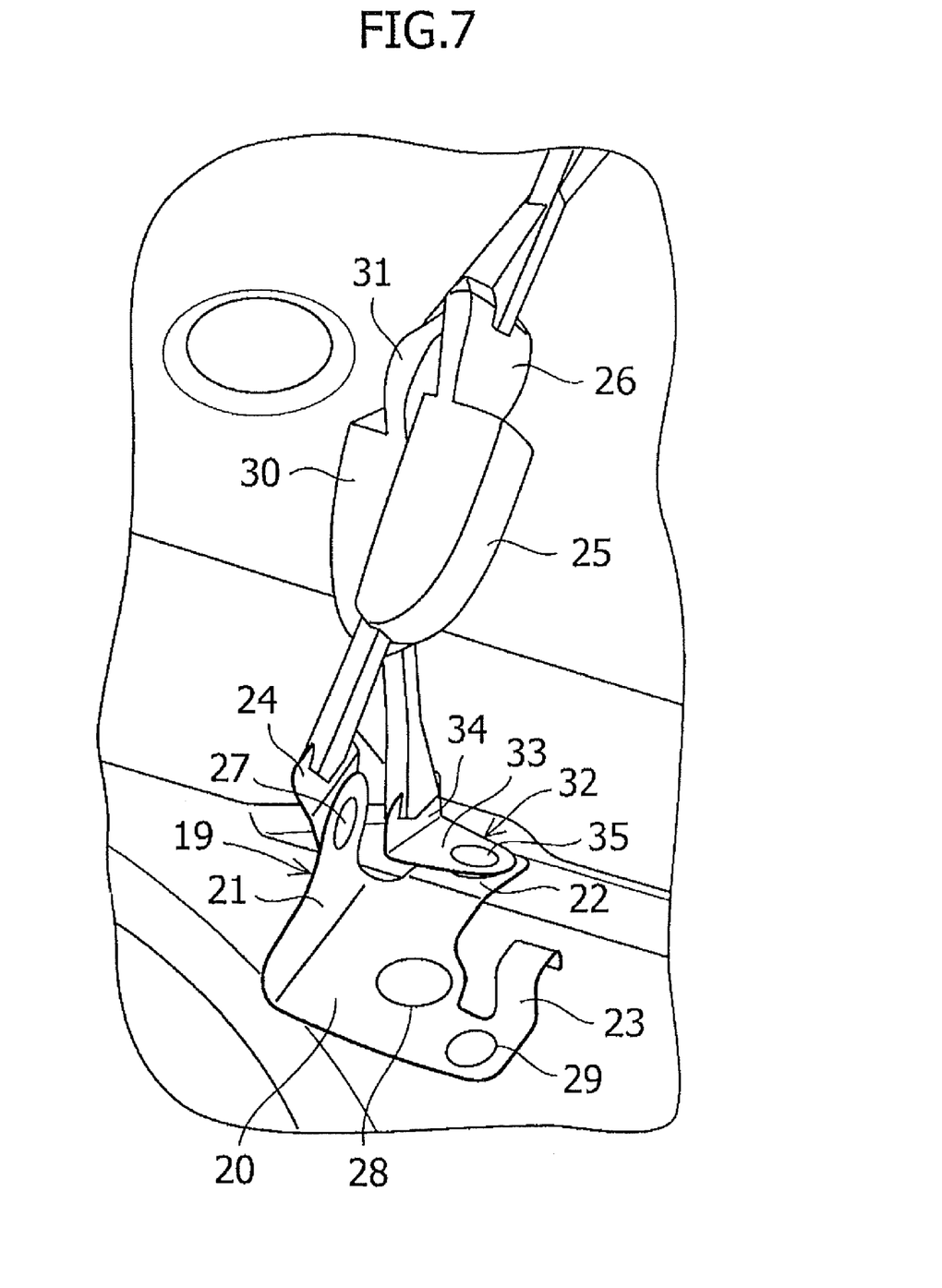
FIG. 7 is an enlarged perspective view of the vehicle body rear portion according to the embodiment of the present invention viewed from above.

FIG. 1 is a perspective view of a vehicle body rear portion according to an embodiment of the present invention viewed from above, and FIG. 2 is a view of the vehicle body rear portion according to the embodiment of the present invention viewed from below. FIG. 3 is a partial cross-sectional view of the vehicle body rear portion according to the embodiment of the present invention viewed from below, and FIG. 4 is a cross-sectional view taken along the line A-A in FIG. 3. FIG. 5 is an enlarged perspective view of the vehicle body rear portion according to the embodiment of the present invention viewed from below, and FIG. 6 is an enlarged perspective view of a seat belt anchor bracket according to the embodiment of the present invention. FIG. 7 is an enlarged perspective view of the vehicle body rear portion according to the embodiment of the present invention viewed from above. Note that, in FIGS. 5 and 6, a rear floor panel is omitted.

As shown in FIGS. 1 and 2, a pair of rear side members 2 and 3 extending in a vehicle front-rear direction are disposed at a rear portion of a vehicle body 1. On top of the pair of rear side members 2 and 3, a rear floor panel 4 is disposed. In addition, the rear floor panel 4 is provided with a spare tire housing 5 which is formed to be concave downward in the vehicle at a substantially center position in a vehicle width direction.

As shown in FIGS. 1 and 2, under the rear floor panel 4, a cross member 6 is disposed at a position on a front side of the spare tire housing 5 in the vehicle. The cross member 6 extends in the vehicle width direction, and both end portions 6a, 6b of the cross member 6 in the vehicle width direction are connected to the pair of the rear side members 2 and 3.

In addition, as shown in FIGS. 1 and 2, the cross member 6 includes a main body portion 7 disposed at a center position in the vehicle width direction, and two brace portions 8 and 9 which are connected to the rear side members 2 and 3, and which are disposed with the main body portion 7 interposed therebetween. Note that, in this embodiment, the rigidity of the main body portion 7 of the cross member 6 is set lower than the rigidities of the two brace portions 8 and 9.

As shown in FIG. 2, under the rear floor panel 4, a fuel tank 10 is disposed at a position corresponding to the main body portion 7 of the cross member 6. The fuel tank 10 is supported from below by first and second suspension belts 11 and 12. The first and second suspension belts 11 and 12 are arranged in such a manner as to be suspended between the main body portion 7 of the cross member 6 and the rear floor panel 4.

As shown in FIG. 2, under the rear floor panel 4, an exhaust pipe 13 is disposed which extends from an engine (not illustrated) through an exhaust system heat exchanger (not illustrated) and the like to the vehicle rear side. The exhaust pipe 13 is provided with a muffler 14 for reducing exhaust sound. The muffler 14 is disposed on the right side in the vehicle width direction with respect to an axis passing through the center of the spare tire housing 5.

In this embodiment, as shown in FIG. 2, a muffler suspending bracket (second lower bracket) 15 is provided to the main body portion 7 of the cross member 6. The muffler suspending bracket 15 is disposed between the main body portion 7 of the cross member 6 and the spare tire housing 5, while being offset (shifted) rightward in the vehicle width direction with respect to the axis passing through the center of the spare tire housing 5. In other words, the muffler suspending bracket 15 is disposed in such a manner as to be shifted to the side on which the muffler 14 is disposed, with respect to the axis passing through the center of the spare tire housing 5.

As shown in FIG. 4, an end portion 15a, on a vehicle front side, of the muffler suspending bracket 15 is fixed by welding to the main body portion 7 of the cross member 6 on a lower surface side of the main body portion 7. In addition, as shown in FIG. 4, the muffler suspending bracket 15 extends toward the rear of the vehicle along the rear floor panel 4 from a rear end portion 7a of the main body portion 7 of the cross member 6.

As shown in FIGS. 4 to 6, the muffler suspending bracket 15 includes a support rod 17 for supporting the muffler 14. The support rod 17 extends toward the rear of the vehicle, and is connected to the muffler 14. In addition, as shown in FIG. 4, the muffler suspending bracket 15 is formed to be concave downward in the vehicle. In addition, in a plan view of FIG. 2, the muffler suspending bracket 15 is cut obliquely along an arc of the spare tire housing 5 at a portion 15b adjacent to the spare tire housing 5.

As shown in FIGS. 5 and 6, the main body portion 7 of the cross member 6 is provided with a seat belt anchor reinforcement (first lower bracket) 18 disposed at the same position of the muffler suspending bracket 15 and above the muffler suspending bracket 15. In the plan view of FIG. 2, the seat belt anchor reinforcement 18 has substantially the same shape as the muffler suspending bracket 15.

As shown in FIG. 4, an end portion 18a, on the vehicle front side, of the seat belt anchor reinforcement 18 is fixed by welding to the main body portion 7 of the cross member 6 on an upper surface side of the main body portion 7. In addition, as shown in FIGS. 5 and 6, the muffler suspending bracket 15 and the seat belt anchor reinforcement 18 are disposed in a vertically superposed manner. As a result, as shown in FIG. 4, a closed section is formed between the muffler suspending bracket 15 and the seat belt anchor reinforcement 18.

In addition, as shown in FIG. 2, a vehicle-rear-side end portion 15c of the muffler suspending bracket 15 and a vehicle-rear-side end portion 18b of the seat belt anchor reinforcement 18 are disposed adjacent to a bent portion around the spare tire housing 5. In addition, as shown in FIG. 4, the vehicle-rear-side end portion 15c of the muffler suspending bracket 15 and the vehicle-rear-side end portion 18b of the seat belt anchor reinforcement 18 are superposed on each other, and are fixed by welding to a lower surface of the rear floor panel 4.

As shown in FIGS. 4 to 7, the rear floor panel 4 is provided with a seat belt anchor bracket (upper bracket) 19. As shown in FIGS. 4 to 6, the seat belt anchor bracket 19 and the seat belt anchor reinforcement 18 are disposed in such a manner as to correspond to each other in the vertical direction.

As shown in FIGS. 6 and 7, the seat belt anchor bracket 19 includes a plate portion 20 extending horizontally, and a standing portion 21 standing upward from the plate portion 20. In addition, the plate portion 20 of the seat belt anchor bracket 19 includes a first extension portion 22 extending from the plate portion 20 toward the vehicle front, and a second extension portion 23 extending from the plate portion 20 toward a vehicle lateral side, and then being bent toward the vehicle front.

As shown in FIGS. 6 and 7, a first connection member 24 is attached to the standing portion 21 of the seat belt anchor bracket 19. The first connection member 24 is connected to a first buckle 25. In addition, the first buckle 25 is configured to engage with a first seat belt tongue 26. As shown in FIG. 7, the standing portion 21 of the seat belt anchor bracket 19 and the first connection member 24 are connected to each other by a spot weld 27.

In addition, as shown in FIG. 7, the plate portion 20 and the rear floor panel 4 are connected to each other by a spot weld 28. Moreover, the second extension portion 23 of the plate portion 20 and the rear floor panel 4 are connected to each other by a spot weld 29.

In addition, as shown in FIG. 7, a second connection member 32 is attached to the first extension portion 22 of the plate portion 20. The second connection member 32 is connected to a second buckle 30. In addition, the second buckle 30 is configured to engage with a second seat belt tongue 31. The second connection member 32 includes a flat portion 33 extending horizontally, and a standing portion 34 standing upward from the flat portion 33. As shown in FIG. 7, the flat portion 33 of the second connection member 32, the first extension portion 22 of the plate portion 20, and the rear floor panel 4 are connected by a spot weld 35, with the three being superposed.

According to the above-described structure, the three brackets, i.e., the muffler suspending bracket 15, the seat belt anchor reinforcement 18, and the seat belt anchor bracket 19, are attached at the same position with the rear floor panel 4 interposed therebetween.

As described above, in the bracket structure in the vehicle body rear portion according to this embodiment, the rear floor panel 4 forming the rear floor of the vehicle body 1 is provided with the cross member 6 extending in the vehicle width direction. The rear floor panel 4 is provided with the spare tire housing 5 for housing a spare tire, the spare tire housing 5 being located rearward of the cross member 6 in the vehicle. To the cross member 6, the three brackets, i.e., the muffler suspending bracket 15, the seat belt anchor reinforcement 18, and the seat belt anchor bracket 19, are connected. In addition, in this embodiment, the muffler suspending bracket 15 and the seat belt anchor reinforcement 18 extend toward the rear of the vehicle from the cross member 6 along the rear floor panel 4. The muffler suspending bracket 15, the seat belt anchor reinforcement 18, and the seat belt anchor bracket 19 are disposed in such a manner as to be shifted to the side on which the muffler 14 is disposed (the right side in the vehicle width direction) with respect to the axis passing through the center of the spare tire housing 5. The muffler suspending bracket 15 is formed in a concave shape. A closed section is formed between the muffler suspending bracket 15 and the seat belt anchor reinforcement 18 by superposing the muffler suspending bracket 15 and the seat belt anchor reinforcement 18. The seat belt anchor bracket 19 is attached to a top surface of the rear floor panel 4. The seat belt anchor bracket 19 and the seat belt anchor reinforcement 18 are disposed so as to correspond to each other in the vertical direction.

Accordingly, the three brackets, which are conventionally attached to the cross member at different positions, are superposed and disposed at a single position on the cross member 6. Hence, the load is absorbed at the single position by the three brackets in cooperation. This not only improves the rigidity against the load, but also makes it possible to efficiently absorb the load. Moreover, since the muffler suspending bracket 15 and the seat belt anchor reinforcement 18 form a closed section, the rigidity upon reception of the load can be further increased.

In addition, according to this embodiment, a space is secured between the spare tire housing 5 and the cross member 6. Accordingly, even when a load is applied from the vehicle rear side, the interference between the fuel tank 10 and the exhaust pipe 13 can be reduced.

In addition, according to this embodiment, the muffler suspending bracket 15 is disposed at the position close to the muffler 14. Hence, the stability of the muffler 14 suspended is improved in comparison with conventional cases. This makes it possible to reduce vibration noise transmitted from the muffler 14 in comparison with conventional cases.

In addition, according to this embodiment, the seat belt anchor bracket 19 and the seat belt anchor reinforcement 18 are supported from below by the muffler suspending bracket 15. Hence, the attachment rigidity of the seat belt anchor bracket 19 can be increased in comparison with conventional cases.

In addition, since the seat belt anchor bracket 19 is disposed at a position rearward of the rear seat in the vehicle body, a load imposed obliquely from an up-front position in the seat belt can be received by the seat belt anchor bracket 19 along the direction of the load. Accordingly, the load of the seat belt can be absorbed more efficiently.

In addition, in the bracket structure in the vehicle body rear portion according to this embodiment, the vehicle-rear-side end portion 15c of the muffler suspending bracket 15 and the vehicle-rear-side end portion 18b of the seat belt anchor reinforcement 18 are disposed adjacent to the bent portion around the spare tire housing 5. The bent portion of the spare tire housing 5 has a higher rigidity than a flat portion thereof because of the bead effect. Hence, when being disposed adjacent to the bent portion, the vehicle-rear-side end portion 15c of the muffler suspending bracket 15 and the vehicle-rear-side end portion 18b of the seat belt anchor reinforcement 18 can increase the rigidity in cooperation with the bent portion of the spare tire housing 5.

In addition, in the bracket structure in the vehicle body rear portion according to this embodiment, the cross member 6 includes the main body portion 7 disposed at the center position in the vehicle width direction, and the two brace portions 8 and 9 connected to side members 2 and 3 and disposed with the main body portion 7 interposed therebetween. The muffler suspending bracket 15, the seat belt anchor reinforcement 18, and the seat belt anchor bracket 19 are disposed on the main body portion 7 of the cross member 6, and the rigidity of the main body portion 7 of the cross member 6 is set lower than the rigidities of the two brace portions 8 and 9. Accordingly, when subjected to a load from the vehicle rear side due to collision or the like, the main body portion 7 of the cross member 6 can deform to absorb the load. In addition, the load from the seat belt is also absorbed by not only the deformation of the muffler suspending bracket 15, the seat belt anchor reinforcement 18, and the seat belt anchor bracket 19, but also the deformation of the main body portion 7 alone of the cross member 6. Accordingly, the load imposed on the two brace portions 8 and 9 of the cross member 6 is reduced. As a result, the load imposed on the vehicle main body (particularly, side members 2 and 3) can be reduced. Since this suppresses the deformation of the vehicle main body, the number of parts to be replaced during repair can be reduced.

In the above-described embodiment, the muffler suspending bracket 15 is disposed in such a manner as to be shifted to the right in the vehicle width direction from the axis passing through the center of the spare tire housing 5. However, the side to which the muffler suspending bracket 15 is shifted only needs to correspond to the side on which the muffler 14 is disposed. When the muffler is disposed on the left side with respect to the axis, the muffler suspending bracket 15 may be disposed on the left side in the vehicle width direction with respect to the axis.

In the above-described embodiment, spot welding is employed for attaching the muffler suspending bracket 15, the seat belt anchor reinforcement 18, and the seat belt anchor bracket 19. However, welding by $CO_2$ or laser may also be employed.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A bracket structure in a vehicle body rear portion, comprising:
 a rear floor panel forming a floor in a rear portion of a vehicle interior;
 a cross member disposed on the rear floor panel, and extending in a vehicle width direction; and
 a spare tire housing disposed on the rear floor panel, and configured to house a spare tire on a rear side of the cross member in a vehicle, wherein
 a plurality of brackets are connected to the cross member,
 the plurality of brackets include an upper bracket disposed above the rear floor panel, a first lower bracket disposed under the rear floor panel, and a second lower bracket disposed under the first lower bracket,
 the first lower bracket and the second lower bracket extend toward a rear of the vehicle from the cross member along the rear floor panel,
 the upper bracket, the first lower bracket, and the second lower bracket are disposed in such a manner as to be offset to a right side or a left side in the vehicle width direction with respect to an axis passing through a center of the spare tire housing,
 the second lower bracket is formed in a concave shape, and a closed section is formed between the first lower bracket and the second lower bracket by superposing the first lower bracket and the second lower bracket, and
 the upper bracket is attached to a top surface of the rear floor panel, and the upper bracket and the first lower bracket are disposed so as to be vertically aligned with each other in a vertical direction.

2. The bracket structure according to claim 1, wherein
 the first lower bracket and the second lower bracket are disposed between the cross member and the spare tire housing, and
 rear end portions of the first lower bracket and the second lower bracket are disposed adjacent to a bent portion around the spare tire housing.

3. The bracket structure according to claim 1, wherein
 the second lower bracket is a muffler suspending bracket for supporting a muffler, and
 the upper bracket and the first and second lower brackets are disposed in such a manner as to be offset to the right side or the left side on which the muffler is disposed, with respect to the axis passing through the center of the spare tire housing.

4. The bracket structure according to claim 1, wherein
 the upper bracket is a seat belt anchor bracket, and
 the first lower bracket is a seat belt anchor reinforcement.

5. The bracket structure according to claim 1, wherein
 the cross member includes a main body portion disposed at a center position in the vehicle width direction and two brace portions connected to side members and disposed with the main body portion interposed therebetween,
 the upper bracket, the first lower bracket, and the second lower bracket are disposed on the main body portion of the cross member, and
 a rigidity of the main body portion of the cross member is set lower than rigidities of the two brace portions.

* * * * *